(12) United States Patent
Ho et al.

(10) Patent No.: US 9,418,774 B2
(45) Date of Patent: Aug. 16, 2016

(54) CURABLE EPOXY RESIN COMPOSITION

(71) Applicant: ABB Research Ltd., Zürich (CH)

(72) Inventors: Chau-Hon Ho, Birr (CH); Spiros Tzavalas, Lengnau (CH)

(73) Assignee: ABB RESEARCH LTD, Zurich (CH)

( * ) Notice: Subject to any disclaimer, the term of this patent is extended or adjusted under 35 U.S.C. 154(b) by 166 days.

(21) Appl. No.: 14/167,373

(22) Filed: Jan. 29, 2014

(65) Prior Publication Data

US 2014/0148529 A1 May 29, 2014

Related U.S. Application Data

(63) Continuation of application No. PCT/EP2011/063148, filed on Jul. 29, 2011.

(51) Int. Cl.
| | |
|---|---|
| *C08L 63/00* | (2006.01) |
| *C08G 59/68* | (2006.01) |
| *C08G 59/70* | (2006.01) |
| *H01B 3/40* | (2006.01) |
| *C08G 59/18* | (2006.01) |
| *C08G 59/24* | (2006.01) |
| *B32B 27/04* | (2006.01) |
| *B32B 27/26* | (2006.01) |
| *B32B 27/38* | (2006.01) |

(52) U.S. Cl.
CPC ............ *H01B 3/40* (2013.01); *C08G 59/18* (2013.01); *C08G 59/245* (2013.01); *C08G 59/68* (2013.01); *C08L 63/00* (2013.01)

(58) Field of Classification Search
None
See application file for complete search history.

(56) References Cited

U.S. PATENT DOCUMENTS

| | | | | |
|---|---|---|---|---|
| 3,812,214 A | * | 5/1974 | Markovitz | C08G 59/70 |
| | | | | 252/600 |
| 4,160,926 A | * | 7/1979 | Cope | H02K 3/345 |
| | | | | 174/110 N |
| 4,603,182 A | * | 7/1986 | Markovitz | C08F 283/10 |
| | | | | 428/364 |

FOREIGN PATENT DOCUMENTS

| | | |
|---|---|---|
| CN | 1534074 A | 10/2004 |
| CN | 101108892 A | 1/2008 |
| EP | 1408087 A1 | 4/2004 |
| EP | 1881033 A1 | 1/2008 |
| GB | 1402899 A | 8/1975 |
| WO | WO 82/04256 A1 | 12/1982 |
| WO | WO 82/04437 A1 | 12/1982 |

OTHER PUBLICATIONS

International Search Report (PCT/ISA/210) mailed on May 3, 2012, by the European Patent Office as the International Searching Authority for International Application No. PCT/EP2011/063148.
Written Opinion (PCT/ISA/237) mailed on May 3, 2012, by the European Patent Office as the International Searching Authority for International Application No. PCT/EP2011/063148.
Chinese Office Action and Search Report issued in corresponding Chinese Patent Application No. 201180072652.0 fated May 6, 2015, and translation thereof.

* cited by examiner

*Primary Examiner* — Michael J Feely
(74) *Attorney, Agent, or Firm* — Taft Stettinius & Hollister LLP

(57) ABSTRACT

A curable epoxy resin composition including a defined aromatic epoxy resin component and a defined latent catalyst system, and optionally further additives, the curable composition being a single epoxy resin composition having a prolonged pot life at a processing temperature within the range of 40° C. to 70° C., wherein: (a) the epoxy resin component is a compound of formula (I) in monomeric form or in a low polymeric form thereof, or is a mixture of such compounds:

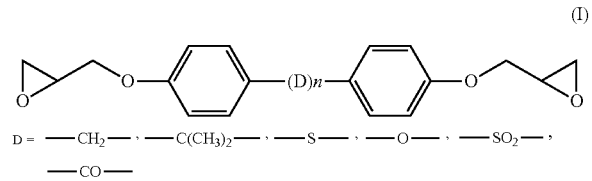

$n$ = zero or one the epoxy resin component having an inherent viscosity within the range of 80 mPas to 300 mPas, measured at a temperature of 50° C.; (b) the latent catalyst system includes at least one metal acetylacetonate and at least one phenolic compound.

24 Claims, 4 Drawing Sheets

CURABLE EPOXY RESIN COMPOSITION

RELATED APPLICATION(S)

This application claims priority as a continuation application under 35 U.S.C. §120 to PCT/EP2011/063148 filed as an International Application on Jul. 29, 2011 designating the U.S., the entire content of which is hereby incorporated by reference in its entirety.

FIELD

The present disclosure relates to a curable epoxy resin composition comprising a defined aromatic epoxy resin component and a defined latent catalyst system, and optionally further additives. Provided is a curable composition that is a volatile-free single epoxy resin composition having a prolonged pot life at a processing temperature within the range of 40° C. to 70° C. Provided is a curable epoxy resin composition that on curing yields cured products with good electrical properties and can be useful in the production of high voltage electrical insulations which require impregnation and/or wet winding applications as well as a low viscosity of the curable epoxy resin composition used therefor.

BACKGROUND INFORMATION

In the production of electrical insulations, for example, in the production of high voltage applications, epoxy resin compositions comprising a hardener component, such as an acid anhydride hardener component, can be used due to their excellent electrical and mechanical properties. However, using acid anhydrides may cause health damage, for example, when such compounds are industrially used in open processes, such as in open impregnation or wet winding applications.

In order to minimize such health damage, it has been proposed to use epoxy resin compositions which are free of compounds which generate emission of highly volatile organic compounds during processing, i.e., which are volatile-free, for example, which are free of acid anhydrides and volatile diluents such as styrene or methyl methacrylate, and which are cured in the presence of a catalyst. Such epoxy resin compositions contain a latent catalyst, the latent catalyst comprising, for example, a metal acetylacetonate or a mixture of such compounds. The term latent catalyst means that the catalyst is present as an integral part within the composition.

For electrical insulation applications, for example, for high voltage applications, however, it can be beneficial to fulfill requirements for material properties and processing parameters. In case of impregnation applications, for example, for impregnating mica tape wound coils for electrical machines or for the impregnation of paper wound conductors for bushings, or for filament wet winding applications, it is substantial that the curable epoxy resin composition has a long pot life, i.e., slow curing speed at processing temperature and a short gel time, i.e., fast cross-linking reaction, for example, polymerization reaction, at curing temperature. Further, a low dielectric loss of the final cured insulating material within a wide temperature range can be beneficial, for example, for high voltage applications. However, the properties of a long pot life and a short gel time are contradictory. In general, a long pot life goes along with a prolonged gel time, caused by the low reactivity and slow polymerization speed of the composition, while a short gel time goes along with a short pot life, caused by the elevated reactivity and elevated polymerization speed of the composition.

For most impregnation applications, such as impregnating or filament wet winding applications, a low viscosity can be desirable for proper processing. In the absence of any hardener component or volatile diluents, the epoxy resin needs to be heated up for decreasing the viscosity. This heating up to an elevated temperature, however, causes a viscosity increase and a shortened pot life. For vacuum pressure impregnation (VPI) of mica tape wound coils and wet winding processes for fibers, the resin in the tank or basin is used for several production runs and products. Thus, a long pot life at processing temperature with stable low viscosity is substantial for obtaining good impregnation quality and keeping production costs low as, for example, vacuum pressure impregnation (VPI) and filament wet winding processes are continuous production processes using partially open tanks or basins.

Fast gelling in the curing oven, i.e., after impregnation or winding, can be important in order to avoid the curable epoxy resin composition dripping off the impregnated or the wet wound parts before being cured. Thus, short gel times below 10-30 minutes at curing temperature can be required.

Epoxy resin formulations comprising an epoxy resin component and a catalyst system composed of a metal acetylacetonate and a phenolic compound are disclosed, for example, in GB 1402899. Such catalytic systems are described as providing stability to the curable epoxy resin formulation at room temperature for a long period of time. Basically, the chemical activity of such catalytic systems is not limited to the type of epoxy resin. GB 1402899 describes the activity of the catalytic system at elevated temperatures, such as 100° C. to 160° C., while using epoxy resin compositions, especially cycloaliphatic compounds, which have a low viscosity at room temperature. Such low viscosity at room temperature allows use of these cycloaliphatic compounds in VPI and filament wet winding processes at room temperature. Also, storage of said curable epoxy resin formulations was performed at room temperature whereby no gelation occurred. However, for producing electrical insulators from aromatic epoxy resin compounds, such as from diglycidylether of bisphenol A (DGEBA), due to the high viscosity of DGEBA at room temperature, it is beneficial to keep the curable epoxy resin formulation at elevated temperature during processing, such as at about 50° C., for a longer period of time without gelling.

SUMMARY

There is a need for, for example, a curable epoxy resin composition having at the same time a long pot life within a temperature range of about 40° C. to about 70° C., and a short gel time at temperature above 100° C. and which on curing yields shaped articles with low dielectric loss values, for example, for processes requiring impregnation and/or wet winding applications. Further, there is a need for epoxy compositions which comprise an aromatic epoxy resin which is comparatively cheap and commercially available.

It has now been found that exemplary curable epoxy resin compositions comprising a defined aromatic epoxy resin component and a defined latent catalyst system comprising at least one metal acetylacetonate and a phenolic compound can fulfill the desirable characteristics or requirements of having a long pot life at a processing temperature within the range of about 40° C. to 70° C. and at the same time have a short gel time at a temperature above 100° C. For example, the curable composition according to the present disclosure is a volatile-free single epoxy resin composition having a low and stable viscosity at processing, for example, impregnation temperature resulting in a prolonged pot life. Said curable epoxy resin composition at the same time has a high reactivity at elevated curing temperatures and on curing yields cured products with good electrical properties, such as products with low dielectric loss values, and can be useful in the production of high voltage electrical insulations which require impregnation and/or wet winding applications.

The prolonged pot life is at least one week, preferably at least three weeks, at a processing temperature within the range of about 40° C. to 70° C., which is achieved by continuous resin replenishment, for example at a rate within the range of 10% to 30% of fresh resin per week, calculated to the total amount of resin present in the tank. With a resin replenishment rate of, for example, 20% per week, the steady state viscosity is reached after about ten weeks.

According to an exemplary aspect, the curable epoxy resin composition polymerizing without the addition of a hardener component is also called a curable homopolymerizing epoxy resin composition or a curable single epoxy resin composition and can be useful in producing high voltage electrical insulations requiring impregnation and/or wet winding applications.

According to an exemplary aspect, provided is a curable epoxy resin composition, comprising an aromatic epoxy resin component and a latent catalyst system, and optionally further additives, said curable composition being a volatile-free single epoxy resin composition having a prolonged pot life at a processing temperature within the range of 40° C. to 70° C., wherein:

(a) the aromatic epoxy resin component is a compound of formula (I) in monomeric form or in polymeric form thereof, or as a mixture thereof:

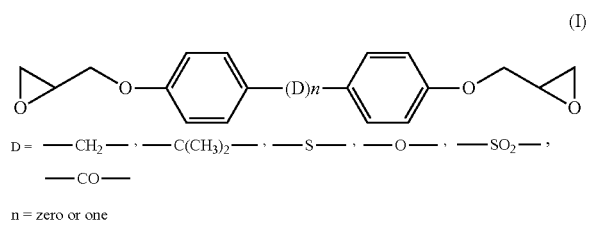

D = —CH$_2$—, —C(CH$_3$)$_2$—, —S—, —O—, —SO$_2$—, —CO— n = zero or one said epoxy resin component having an inherent viscosity within the range of 80 mPas to 300 mPas, measured at a temperature of 50° C.;

(b) the latent catalyst system comprises at least one metal acetylacetonate and at least one phenolic compound, wherein (b1) the metal acetylacetonate is present in a concentration of 0.1 phr to 1.0 phr (parts per hundred parts) of the epoxy resin component; and (b2) the phenolic compound is a dihydroxybenzene or a trihydroxybenzene or a mixture thereof, and is present in a concentration of 2.0 phr to 4.0 phr (parts per hundred parts) of the epoxy resin component;

wherein said curable epoxy resin composition is kept at a temperature within the range of 40° C. to 70° C. and the prolonged pot life at said temperature is provided to the composition by continuous resin replenishment with fresh resin at a rate within the range of 10% to 30% of fresh resin per week, calculated to the total amount of resin present in the tank, said fresh resin having an inherent viscosity within the range of 80 mPas to 300 mPas, measured at a temperature of 50° C.

According to another exemplary aspect, provided is a method of producing high voltage electrical insulation, the method comprising using an exemplary curable epoxy resin composition in an impregnation and/or wet winding application technique.

According to another exemplary aspect, provided is a shaped article in the form of an electrical insulator, wherein the shaped article is made from an exemplary curable epoxy resin composition.

According to another exemplary aspect, provided is an electrical article comprising an electrical insulator made from an exemplary curable epoxy resin composition.

According to another exemplary aspect, provided is a method of producing the curable epoxy resin composition according to claim 1, wherein fresh resin, having an inherent viscosity within the range of 80 mPas to 300 mPas measured at 50° C., is continuously provided to the composition in the pot at a temperature range of 40° C. to 70° C., by continuous resin replenishment at a rate within the range of 10% to 30% of fresh resin per week, calculated to the total amount of resin present in the tank.

DETAILED DESCRIPTION

Figure 1:
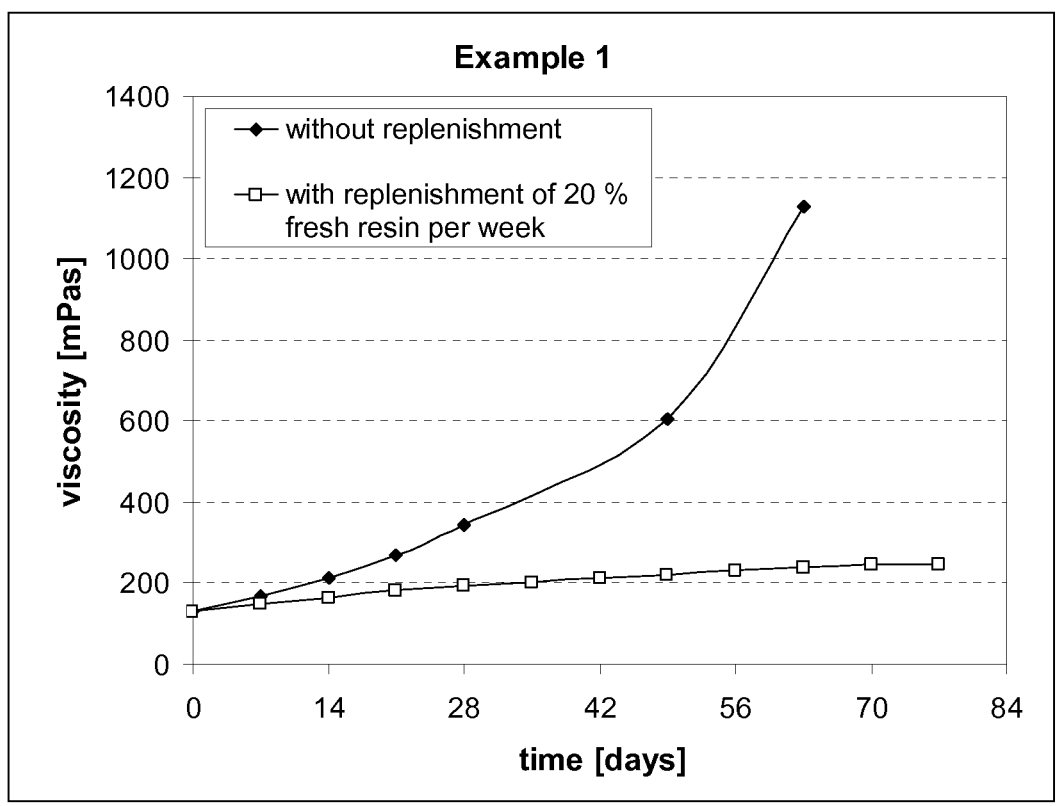
FIG. 1 is a graph of time vs. viscosity illustrating the results of Example 1, according to an exemplary aspect.

The present disclosure relates to a curable epoxy resin composition comprising a defined aromatic epoxy resin component and a defined latent catalyst system, and optionally further additives, said curable composition being a volatile-free single epoxy resin composition having a prolonged pot life at a processing temperature within the range of 40° C. to 70° C., wherein:

(a) the epoxy resin component is a compound of formula (I) in monomeric form or in a low polymeric form thereof, or is a mixture of such compounds:

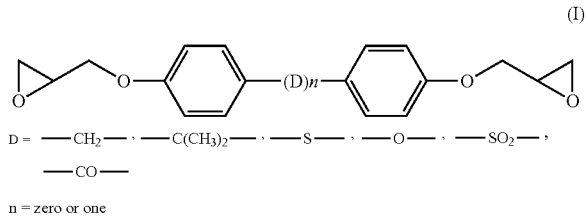

D = —CH$_2$—, —C(CH$_3$)$_2$—, —S—, —O—, —SO$_2$—, —CO— n = zero or one said epoxy resin component having an inherent viscosity within the range of 80 mPas to 300 mPas, measured at a temperature of 50° C.;

(b) the latent catalyst system comprises at least one metal acetylacetonate and at least one phenolic compound, wherein (b1) the metal acetylacetonate is selected from metal acetylacetonate compounds, or is a mixture of these compounds, and is present in a concentration of 0.1 phr to 1.0 phr (parts per hundred parts) of the epoxy resin component; and (b2) the phenolic compound is a dihydroxybenzene or a trihydroxybenzene or any mixture thereof, and is present in a concentration of 2.0 phr to 4.0 phr (parts per hundred parts) of the epoxy resin component;

wherein, said curable epoxy resin composition is kept at a temperature within the range of 40° C. to 70° C. and the prolonged pot life at said temperature is provided to the composition by continuous resin replenishment with fresh resin at a rate within the range of 10% to 30% of fresh resin per week, for example, at a rate of 20% of fresh resin per week, calculated to the total amount of resin present in the tank, said fresh resin having an inherent viscosity within the range of 80 mPas to 300 mPas, measured at a temperature of 50° C.

The present disclosure further refers to the use of said curable epoxy resin composition for producing high voltage electrical insulations using impregnation and/or wet winding application techniques. Such application techniques can be impregnating mica tape wound coils for electrical machines or impregnating paper wound conductors for bushings, or filament wet winding applications.

The present disclosure also refers to the use of said curable epoxy resin composition in vacuum pressure impregnation (VPI) applications for mica tape wound coils and wet winding processes for fibers or tapes, at the given temperature range, for example, where the resin in the tank or basin is used for several runs and products.

The present disclosure further refers to a shaped article in the form of an electrical insulator being made from said curable epoxy resin composition, at the given temperature range, for example, by shaping and subsequently curing said curable epoxy resin composition to form the cured solid electrical insulator.

The present disclosure further refers to electrical articles comprising an electrical insulator made from a composition according to the present disclosure.

The present disclosure further refers to a method of producing a curable epoxy resin composition as defined herein above, said curable epoxy resin composition having a prolonged pot life at a processing temperature within the range of 40° C. to 70° C., wherein fresh resin, having an inherent viscosity within the range of 80 mPas to 300 mPas, measured at 50° C., is continuously provided to the composition at said temperature range of 40° C. to 70° C., by continuous resin replenishment at a rate within the range of 10% to 30% of fresh resin per week, for example, at a rate of 20% of fresh resin per week, calculated to the total amount of resin present in the tank.

The curable epoxy resin composition according to the present disclosure generally has a prolonged pot life, i.e., a viscosity increase of 100%, of at least one week, preferably of at least three weeks, at an elevated processing temperature within the range of about 40° C. to 70° C., e.g. at about 50° C., which can be prolonged for several more weeks by continuous resin replenishment at a rate of continuous resin replenishment within the range of 10% to 30% of fresh resin per week, such as a rate of 20% of fresh resin per week, calculated to the total amount of resin present in the tank.

The curable epoxy resin composition which is added to the pot preferably has an "initial" viscosity which is lower than the "steady state" viscosity of the curable epoxy resin composition in the pot, so that the curable composition in the pot can be used for at least ten weeks or more when continuously replenished at the mentioned rate, for example, of about 20%, with the curable epoxy resin composition with the "initial" viscosity.

The curable epoxy resin composition which is added to the pot has an "initial" viscosity, for example, within the range of about 80 mPas to about 120 mPas, for example, within the range of about 100 mPas to about 110 mPas, measured at 50° C.

The "steady state" viscosity of the curable epoxy resin composition, within the context of the present disclosure, means the viscosity range reached after subsequent replenishment at the given rate, e.g. of about 20% per week, keeping the resin composition at "elevated processing temperature", i.e., at a temperature within the range of 40° C. to 70° C., for example, within the range of 45° C. to 60° C., and for example, at about 50° C.

The "steady state" viscosity of the curable epoxy resin composition reached within the pot is preferably within the range of about 260 mPas to about 300 mPas, preferably within the range of about 270 mPas to about 280 mPas, measured at 50° C.

The curable epoxy resin composition within the pot has generally a viscosity within the range of about 80 mPas to about 300 mPas, for example, within the range of about 100 mPas to about 280 mPas, for example, within the range of about 110 mPas to about 270 mPas, and for example, within the range of about 120 mPas to 260 mPas, measured at 50° C.

This means that by using a base aromatic epoxy resin component as defined herein with a starting low initial viscosity within the range of about 80 mPas to about 300 mPas, with the exemplary ranges as given above, curable epoxy resin compositions with a stable steady state viscosity as defined herein can be obtained at a temperature within the range of 40° C. to 70° C., for example, within the range of 45° C. to 60° C., and for example, at about 50° C., as desired or required for processing.

Said curable aromatic epoxy resin composition generally solidifies to a gel within 30 minutes at a maximum temperature of 165° C., i.e., has a short gel time of less than 30 minutes at a maximum temperature of 165° C. Exemplary gelling temperatures are applied within the range of 100° C. to 165° C., for example, within the range of 120° C. to 165° C., and for example, at about 165° C., whereby said gelling times are generally between 20 minutes and 40 minutes, and for example, less than 30 minutes. The composition is subsequently completely cured.

The cured epoxy resin composition obtained from the curable epoxy resin composition according to the present disclosure, further has a low electromagnetic permittivity (∈), measured in SI units (système international d'unités). It is a measure of how much resistance is encountered when forming an electric field in the medium. Said electromagnetic permittivity (∈) can be within the range of 1 to 5 between 40° C. and 180° C. and for example, within the range of 3 to 5 between 40° C. and 180° C.

The cured epoxy resin composition obtained from the curable epoxy resin composition according to the present disclosure, further has low dielectric loss values, known as [tan(δ)]. These values are within the range of 0.001 to 0.100 between 40° C. and 180° C. and for example, within the range of 0.003 to 0.05 between 40° C. and 180° C.

In an exemplary embodiment, said curable epoxy resin composition has no hardener component, for example, no acid anhydride component such as tetrahydrophthalic anhydride, hexahydrophthalic anhydride, methylhexahydrophthalic anhydride, methyltetrahydrophthalic anhydride, or methyl nadic anhydride. In an exemplary embodiment, said curable epoxy resin composition has no volatile diluents such as reactive diluents, such as styrene, vinyl toluene, alpha-methyl styrene, methacrylate or acrylate derivatives and, for example, is a hardener free and a diluent free epoxy resin composition having practically no emissions of volatile organic compounds.

In an exemplary aspect, the epoxy resin component is based on compounds of formula (I):

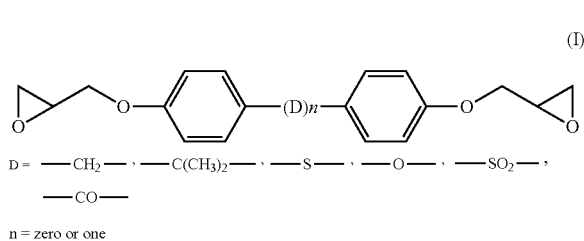

n = zero or one and is present in monomeric form or polymeric form or as a mixture thereof.

Exemplary epoxy resin components according to the present disclosure are: diglycidylether of bisphenol A [DGEBA; D=-C(CH$_3$)$_2$—, n=1]; diglycidylether of bisphenol F [DGEBF; D=-CH$_2$—, n=1]; and diglycidylether bisphenol S [DGEBS; D=-S—, n=1] compounds, or mixtures thereof. Exemplary epoxy resin components are diglycidylether of bisphenol A [DGEBA] and diglycidylether of bisphenol F [DGEBF].

When producing these compounds, the monomeric compounds according to formula (I) as well as low polymeric (oligomeric) compounds derived therefrom are formed so that generally a mixture of these compounds is obtained. Further, when producing for example diglycidyl ether of bisphenol F (DGEBF), there is generally obtained a mixture of isomeric compounds such as a mixture of o,o'-, o,p'- and p,p'-bisglycidyloxyphenylmethane.

These glycidyl compounds can have a molecular weight between 200 and 1200, for example, between 200 and 1000 and have an epoxy value (equiv./kg) of, for example, at least three, for example, at least four and for example, at least about five, for example, about 5.0 to 6.5.

The latent catalyst system comprises at least a metal acetylacetonate and at least a phenolic compound. The metal acetylacetonate [component (b1)] corresponds to the chemical formulae (II), (III), (IV) and (V):

$$[CH_3—C(O)—CH=C(O^-)—CH_3].Me^+ \quad (II)$$

or $$[CH_3—C(O)—CH=C(O^-)—CH_3]_2.Me^{2+} \quad (III)$$

or $$[CH_3—C(O)—CH=C(O)—CH_3]_3.Me^{3+} \quad (IV)$$

or $$[CH_3—C(O)—CH=C(O)—CH_3]_4.Me^{4+} \quad (V).$$

Any suitable metal acetylacetonate can be used within the scope of the present disclosure. Exemplary are metal acetylacetonates wherein Me$^+$ is selected from Li$^+$, Na$^+$ and K$^+$; Me$^{2+}$ is selected from Cu$^{2+}$, Co$^{2+}$, Zn$^{2+}$ and Ca$^{2+}$; Me$^{3+}$ is selected from Al$^{3+}$, V$^{3+}$ and Fe$^{3+}$; and Me$^{4+}$ is selected from Zr$^{4+}$. For example, Me$^{2+}$ is Mg$^{2+}$, and Me$^{3+}$ is selected from Al$^{3+}$ and Fe$^{3+}$.

Exemplary are aluminum acetylacetonate and zirconium acetylacetonate or a mixture of these compounds.

The metal acetylacetonate or the mixture of metal acetylacetonates is present in a concentration of 0.1 phr to 1.0 phr, for example, in a concentration of 0.2 phr to 1.0 phr and for example, in a concentration of 0.5 phr to 1.0 phr (parts per hundred parts) of the epoxy resin component.

The phenolic compound [compound (b2)] is a dihydroxybenzene or a trihydroxybenzene or any mixture thereof, for example, 1,2-dihydroxybenzene (catechol), 1,3-dihydroxybenzene (resorcinol) or 1,4-dihydroxybenzene (hydroquinone) or 1,2,3-trihydroxybenzene (pyrogallol) or 1,2,4-trihydroxybenzene or any mixture of these compounds, for example, catechol or resorcinol or hydroquinone or pyrogallol or any mixture thereof, for example, catechol or resorcinol or hydroquinone, or a mixture thereof. The phenolic compound is present in a concentration of 0.5 phr to 6.0 phr, for example, in a concentration of 1.0 phr to 5.0 phr, for example, in a concentration of 2.0 phr to 4.0 phr, (parts per hundred parts) of the epoxy resin component.

The ratio of the metal acetylacetonate compound [component (b1)] to the phenolic compound [component (b2)] is within the weight ratio of 4.0:1.0 to 1.0:1.0, for example, with the weight ratio of 3.0:1.0 to 1.0:1.0.

The present disclosure further refers to the use of said curable epoxy resin composition for producing high voltage electrical insulations, for example, requiring impregnation and/or wet winding applications. Impregnation processes such as vacuum pressure impregnation (VPI) applications for mica tape wound coils and wet winding processes for fibers wherein the filaments are pre-impregnated with the curable composition followed by winding the impregnated fibers on a mandrel, can be employed.

The curable composition of the present disclosure is made by mixing all the components, optionally under vacuum, in any desired sequence, whereby the latent catalyst [component (b)] is not stored separately but forms an integral part of the composition according to the present disclosure.

The curable epoxy resin composition of the present disclosure can be used for producing high voltage electrical insulations, for example, requiring impregnation and/or wet winding applications as mentioned herein above. However, the composition may also be used for other electrical insulating applications not requiring impregnation and/or wet winding applications.

Depending on the type of insulator to be produced, the curable composition may further contain optional additives selected from filler materials, wetting/dispersing agents, plasticizers, antioxidants, light absorbers, as well as further additives used in electrical applications.

Examples of filler materials are an inorganic filler such as silica and aluminum trihydrate (ATH), glass powder, chopped glass fibers, metal oxides such as silicon oxide (e.g., Aerosil, quartz, fine quartz powder), metal nitrides, metal carbides, natural and synthetic silicates. Also, any suitable average particle size distribution of such fillers and quantity present within the composition as applied in electrical high voltage insulators can be employed. Exemplary filler materials are silica and aluminum trihydrate (ATH).

Plasticizers, antioxidants, light absorbers, as well as further additives used in electrical applications can be employed.

Electrical insulation produced according to the present disclosure can be used for insulating electrical coils and in the production of electrical components such as transformers, bushings, insulators, switches, sensors, converters, cable end seals and high voltage surge arresters.

Exemplary uses of the insulation system produced according to the present disclosure are also high-voltage insulations such as used in overvoltage protectors, in switchgear constructions, in power switches, dry-type transformers, and electrical machines, as coating materials for transistors and other semiconductor elements and/or to impregnate electrical components. The following example illustrates the disclosure.

Examples 1 to 5

The components as given in Example 1 (Table 1), in Example 2 (Table 2), Example 3 (Table 3), Example 4 (Table 4), and Example 5 (Table 5), were mixed at an internal temperature of about 50° C. and kept in the pot at that temperature during processing. When manufacturing cured parts, e.g., plates of about 1 mm thickness, the applied mixtures were degassed in vacuum at 70° C. before application, for example, curing. The mixed components were cast into a mold, said mold being preheated to a temperature of 80° C. to 90° C. The mold was preheated in order to facilitate pouring of the curable resin composition and to avoid air bubbles being trapped during pouring. The compositions were then cured at 165° C. for 24 hours in total. During curing time the resin was transformed into the final thermoset polymer and used as such in the final application of the product (electrical device). During gelling, the polymerization progressed to a highly viscous gel state of the resin, where the resin was not dripping out of the jar.

For pot life determination the resin was kept at suggested processing temperature and its viscosity was measured at regular time intervals.

Dielectric properties [relative permittivity ($\in$) and loss factor (tan δ)] were measured on square samples (38 mm×38 mm) with 1.4 to 1.5 mm thickness. Results are shown at different frequencies and temperatures. Glass transition temperatures (Tg) were measured using differential scanning calorimetry (DSC) with 10 K/min heating rate, respectively.

Meaning of EP158, MY790-1, η, η*, $\in$, tan δ

EP158: Bisphenol F based epoxy resin from Hexion with viscosity of 1-1.4 Pa·s (at 50° C.) and an epoxy content of 6.3 equiv/kg MY790-1: Bisphenol A based epoxy resin from Huntsman with viscosity of 4-6.4 Pa·s (at 50° C.) and epoxy content of 5.6-5.9 equiv/kg η=viscosity of the full formulation at 50° C. [In the Examples, the initial viscosity and the time where the doubled initial viscosity (=100% increase) is reached are shown.]

η*=constant steady state viscosity at 50° C. reached after ca. 10 weeks obtained by resin replenishment with a rate of 20% addition of fresh resin per week. In brackets the total increase in % compared to initial viscosity is shown.

$\in$=relative permittivity tan δ=dielectric loss

Example 1

TABLE 1

| Components | Pot life at 50° C. | Gel time | $T_g$ | Dielectric properties at 50 Hz | | |
|---|---|---|---|---|---|---|
| | | | | T [° C.] | ε | tan δ |
| EP158 | 100% η increase | ca. 25 min | 100° C. | 40 | 3.82 | 0.0042 |
| 3 phr resorcinol | (130 → 260 mPas) | at 165° C. | | 60 | 3.87 | 0.0048 |
| 1 phr zirconium | after 3 weeks | | | 80 | 3.96 | 0.0072 |
| acetylacetonate | Steady state η*: | | | 100 | 4.20 | 0.0177 |
| | 250 mPas (62%) | | | 120 | 4.63 | 0.0265 |
| | | | | 140 | 4.92 | 0.0171 |
| | | | | 160 | 4.96 | 0.0104 |
| | | | | 180 | 4.90 | 0.0129 |

Example 2

TABLE 2

| Composition | Pot life at 50° C. | Gel time | $T_g$ | Dielectric properties at 50 Hz | | |
|---|---|---|---|---|---|---|
| | | | | T [° C.] | ε | tan δ |
| EP158 | 100% η increase | ca. 30 min | 85° C. | 40 | 3.94 | 0.0045 |
| 2 phr resorcinol | (125 → 250 mPas) | at 165° C. | | 60 | 4.02 | 0.0063 |
| 1 phr zirconium | after 5 weeks | | | 80 | 4.16 | 0.0135 |
| acetylacetonate | Steady state η*: | | | 100 | 4.44 | 0.0275 |
| | 200 mPas (60%) | | | 120 | 4.81 | 0.0248 |
| | | | | 140 | 4.92 | 0.0143 |
| | | | | 160 | 4.85 | 0.0173 |
| | | | | 180 | 4.77 | 0.0509 |

Example 3

TABLE 3

| Components | Pot life at 50° C. | Gel time | $T_g$ | Dielectric properties at 50 Hz | | |
|---|---|---|---|---|---|---|
| | | | | T [° C.] | ε | tan δ |
| EP158 | 100% η increase | ca. 25 min | 95° C. | 40 | 3.96 | 0.0046 |
| 2 phr resorcinol | (130 → 260 mPas) | at 160° C. | | 60 | 4.03 | 0.0062 |
| 1 phr hydroquinone | after 5 weeks | | | 80 | 4.15 | 0.0111 |

TABLE 3-continued

| Components | Pot life at 50° C. | Gel time | $T_g$ | T [° C.] | Dielectric properties at 50 Hz ε | tan δ |
|---|---|---|---|---|---|---|
| 1 phr zirconium acetylacetonate | Steady state η*: 220 mPas (69%) | | | 100<br>120<br>140<br>160<br>180 | 4.47<br>4.9<br>5.04<br>4.98<br>4.92 | 0.0257<br>0.0276<br>0.0206<br>0.0519<br>0.1958 |

Example 4

TABLE 4

| Components | Pot life at 50° C. | Gel time | $T_g$ | T [° C.] | Dielectric properties at 50 Hz ε | tan δ |
|---|---|---|---|---|---|---|
| EP158<br>2 phr resorcinol<br>2 phr hydroquinone<br>1 phr zirconium acetylacetonate | 100% η increase (130 → 260 mPas) after 4 weeks Steady state η*: 230 mPas (77%) | ca. 25 min at 160° C. | 110° C. | 40<br>60<br>80<br>100<br>120<br>140<br>160<br>180 | 3.86<br>3.90<br>3.96<br>4.09<br>4.47<br>4.92<br>5.04<br>4.98 | 0.0039<br>0.0042<br>0.0052<br>0.0105<br>0.0257<br>0.0251<br>0.0177<br>0.0494 |

Example 5

TABLE 5

| Components | Pot life at 50° C | Gel time | $T_g$ | T [° C.] | Dielectric properties at 50 Hz ε | tan δ |
|---|---|---|---|---|---|---|
| MY790-1<br>4 phr catechol<br>1 phr aluminium acetylacetonate | 100% η increase (350 → 700 mPas) after 3 weeks | ca. 20 min at 160° C. | 140° C. | 40<br>60<br>80<br>100<br>120<br>140<br>160<br>180 | 3.91<br>3.94<br>3.95<br>3.95<br>3.96<br>4.02<br>4.21<br>4.39 | 0.0028<br>0.0027<br>0.0025<br>0.0026<br>0.0035<br>0.0066<br>0.0141<br>0.0130 |

With a composition (using Bisphenol A based epoxy resins) as shown in Example 5 higher glass transition temperature as well as excellent dielectric properties (very low dielectric losses) can be achieved, especially suitable for high performance high voltage bushings.

Figure 2:
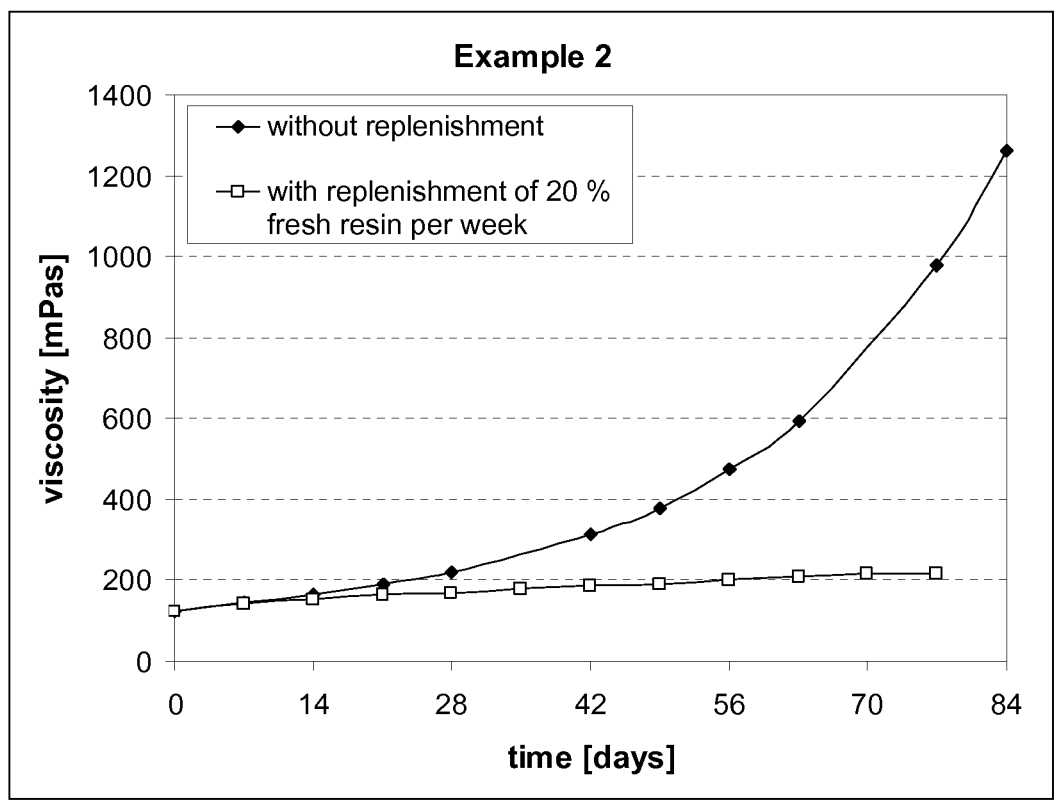
FIG. 2 is a graph of time vs. viscosity illustrating the results of Example 2, according to an exemplary aspect.
Figure 3:
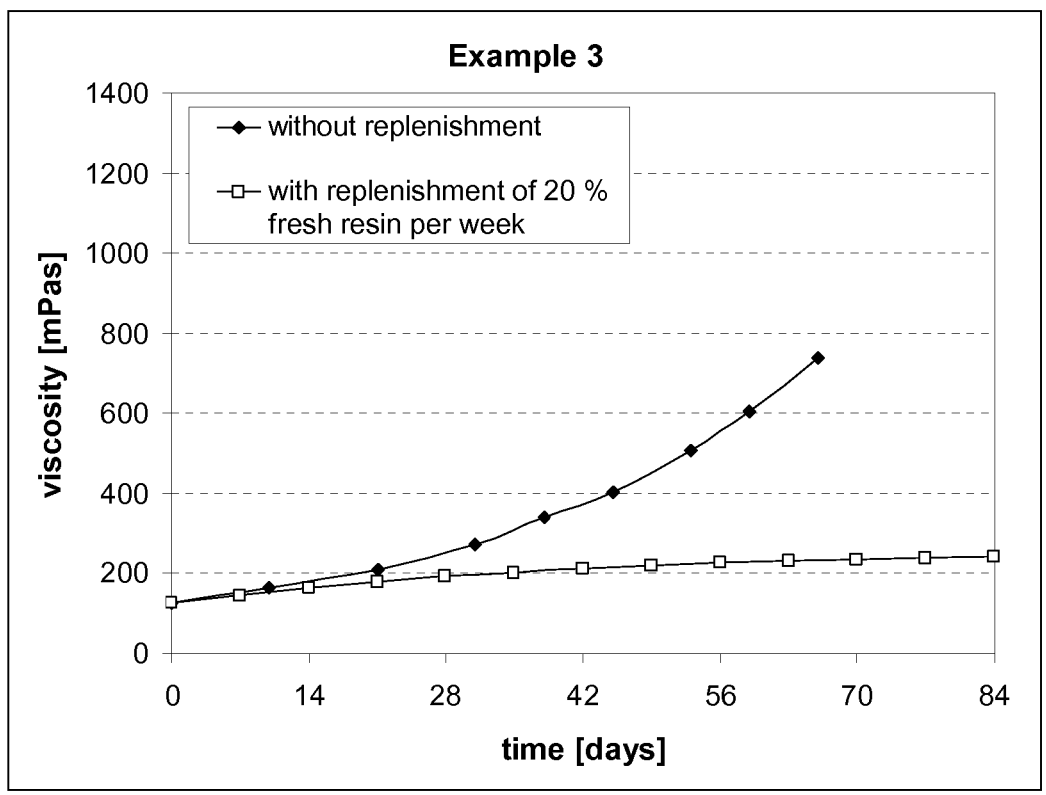
FIG. 3 is a graph of time vs. viscosity illustrating the results of Example 3, according to an exemplary aspect.
Figure 4:
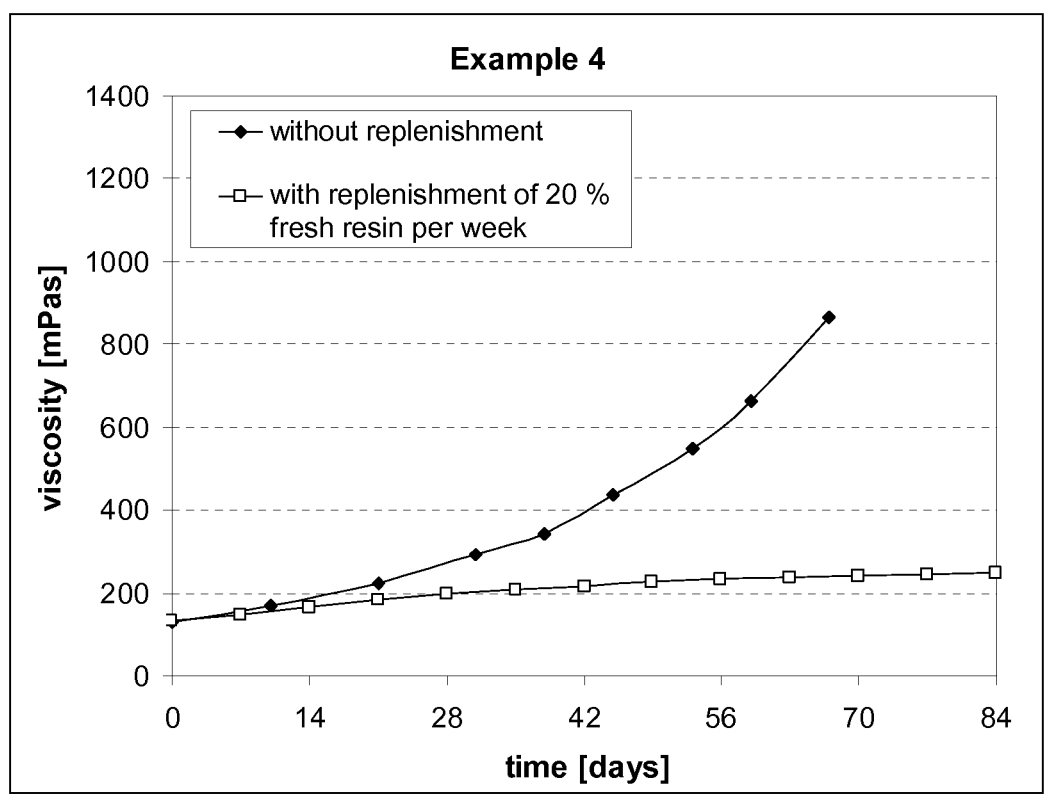
FIG. 4 is a graph of time vs. viscosity illustrating the results of Example 4, according to an exemplary aspect.

FIG. 1 illustrates the results of Example 1; FIG. 2 illustrates the results of Example 2; FIG. 3 illustrates the results of Example 3; and FIG. 4 illustrates the results of Example 4.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of producing a replenished curable epoxy resin composition, the method comprising: providing fresh resin having an inherent viscosity within the range of 80 mPas to 300 mPas measured at 50° C. to a curable epoxy resin composition in a pot at a temperature range of 40° C. to 70° C., by resin replenishment at a rate within the range of 10% to 30% of fresh resin per week, calculated to the total amount of resin present in the pot;
    wherein the fresh resin is a resin that has not been previously added to the pot;
    wherein the fresh resin and the curable epoxy resin composition in the pot comprise an aromatic epoxy resin component, a latent catalyst system, and optional additives;
    wherein the replenished curable epoxy resin composition is a volatile-free single epoxy resin composition having a prolonged pot life at a processing temperature within the range of 40° C. to 70° C.; and
    wherein:
    (a) the aromatic epoxy resin component is a compound of formula (I) in monomeric form or in polymeric form thereof, or as a mixture thereof:

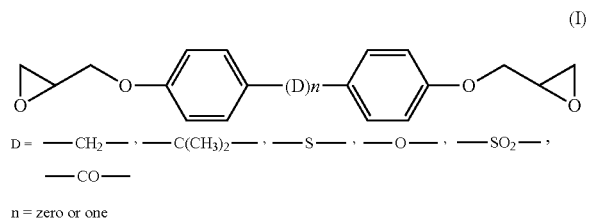

n = zero or one

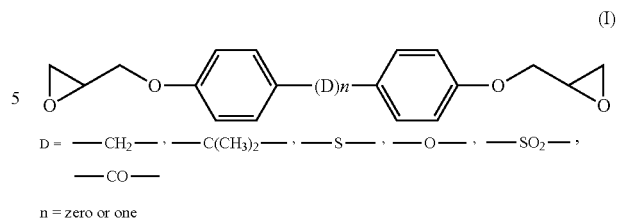

n = zero or one said aromatic epoxy resin component having an inherent viscosity within the range of 80 mPas to 300 mPas, measured at a temperature of 50° C.;

(b) the latent catalyst system comprises at least one metal acetylacetonate and at least one phenolic compound, wherein (b1) the at least one metal acetylacetonate is present in a concentration of 0.1 phr to 1.0 phr (parts per hundred parts) of the epoxy resin component; and (b2) the at least one phenolic compound is a dihydroxybenzene, a trihydroxybenzene or a mixture thereof, and is present in a concentration of 0.5 phr to 6.0 phr (parts per hundred parts) of the epoxy resin component.

2. The method according to claim 1, wherein said curable epoxy resin composition in the pot has a pot life of at least one week, at an elevated processing temperature within the range of about 40° C. to 70° C., which can be prolonged for several more weeks by resin replenishment at a rate of resin replenishment within the range of 10% to 30% of fresh resin per week, calculated to the total amount of resin present in the pot.

3. The method according to claim 1, wherein said curable epoxy resin composition in the pot has a pot life of at least three weeks, at an elevated processing temperature at about 50° C., which can be prolonged for several more weeks by resin replenishment at a rate of resin replenishment of 20% of fresh resin per week, calculated to the total amount of resin present in the pot.

4. The method according to claim 1, wherein the fresh resin has an inherent viscosity within the range of about 80 mPas to about 120 mPas, measured at 50° C.

5. The method according to claim 1, wherein the fresh resin has an inherent viscosity within the range of about 100 mPas to about 110 mPas, measured at 50° C.

6. The method according to claim 1, wherein the viscosity of the replenished curable epoxy resin composition reached within the pot is within the range of about 260 mPas to about 300 mPas, measured at 50° C.

7. The method according to claim 1, wherein the viscosity of the replenished curable epoxy resin composition reached within the pot is within the range of about 270 mPas to about 280 mPas, measured at 50° C.

8. The method according to claim 1, wherein the resin replenishment is 20% of fresh resin per week, calculated to the total amount of resin present in the pot.

9. The method according to claim 1, wherein the fresh resin has an inherent viscosity within the range of about 100 mPas to about 110 mPas, measured at 50° C., and the replenishment rate is 20% of fresh resin per week, calculated to the total amount of resin present in the pot.

10. The method according to claim 1, wherein the aromatic epoxy resin component is based on a compound of formula (I):

and is present in monomeric form or low polymeric form or as a mixture thereof.

11. The method according to claim 10, wherein the aromatic epoxy resin component is diglycidylether of bisphenol A, diglycidylether of bisphenol F, diglycidylether bisphenol S or a mixture thereof.

12. The method according to claim 11, wherein the aromatic epoxy resin component has a molecular weight between 200 and 1200 and an epoxy value (equiv./kg) of at least three.

13. The method according to claim 10, wherein the aromatic epoxy resin component is diglycidylether of bisphenol A, diglycidylether of bisphenol F or a mixture thereof.

14. The method according to claim 13, wherein the aromatic epoxy resin component has a molecular weight between 200 and 1000 and an epoxy value (equiv./kg) of about 5.0 to 6.5.

15. The method according to claim 1, wherein the at least one metal acetylacetonate corresponds to at least one of the chemical formulae (II), (III), (IV) and (V):

$$[CH_3-C(O)-CH=C(O^-)-CH_3].Me^+ \quad (II)$$

$$[CH_3-C(O)-CH=C(O^-)-CH_3]_2.Me^{2+} \quad (III)$$

$$[CH_3-C(O)-CH=C(O)-CH_3]_3.Me^{3+} \quad (IV)$$

$$[CH_3-C(O)-CH=C(O)-CH_3]_4.Me^{4+} \quad (V),$$

wherein $Me^+$ is selected from the group consisting of $Li^+$, $Na^+$ and $K^+$; $Me^{2+}$ is selected from the group consisting of $Cu^{2+}$, $Co^{2+}$, $Zn^{2+}$ and $Ca^{2+}$; $Me^{3+}$ is selected from the group consisting of $Al^{3+}$, $V^{3+}$ and $Fe^{3+}$; and $Me^{4+}$ is $Zr^{4+}$.

16. The method according to claim 15, wherein $Me^{2+}$ is $Mg^{2+}$, and $Me^{3+}$ is selected from the group consisting of $Al^{3+}$ and $Fe^{3+}$.

17. The method according to claim 15, wherein the at least one metal acetylacetonate is aluminum acetylacetonate, zirconium acetylacetonate or a mixture thereof.

18. The method according to claim 15, wherein the at least one metal acetylacetonate is present in a concentration of 0.5 phr to 1.0 phr (parts per hundred parts) of the aromatic epoxy resin component.

19. The method according to claim 1, wherein the at least one phenolic compound is selected from 1,2-dihydroxybenzene (catechol), 1,3-dihydroxybenzene (resorcinol), 1,4-dihydroxybenzene (hydroquinone), 1,2,3-trihydroxybenzene (pyrogallol), 1,2,4-trihydroxybenzene and mixtures thereof.

20. The method according to claim 1, wherein the at least one phenolic compound is catechol, resorcinol, hydroquinone or a mixture thereof.

21. The method according to claim 1, wherein the at least one phenolic compound is present in a concentration of 2.0 phr to 4.0 phr, (parts per hundred parts) of the aromatic epoxy resin component.

22. The method according to claim 1, wherein the ratio of the at least one metal acetylacetonate compound to the at least one phenolic compound is within the weight ratio of 4.0:1.0 to 1.0:1.0.

23. The method according to claim 1, wherein the ratio of the at least one metal acetylacetonate compound to the at least one phenolic compound is within the weight ratio of 3.0:1.0 to 1.0:1.0.

24. The method according to claim 1, wherein the optional additives are present and selected from the group consisting of filler materials, wetting/dispersing agents, plasticizers, antioxidants, and light absorbers.

* * * * *